June 22, 1954  F. M. LE COMPTE  2,681,595

CONTOUR MACHINING SYSTEM

Filed July 29, 1949  2 Sheets-Sheet 1

INVENTOR.
FRANK M. LE COMPTE
BY Godfrey B. Speir
ATTORNEY.

June 22, 1954  F. M. LE COMPTE  2,681,595
CONTOUR MACHINING SYSTEM
Filed July 29, 1949  2 Sheets-Sheet 2
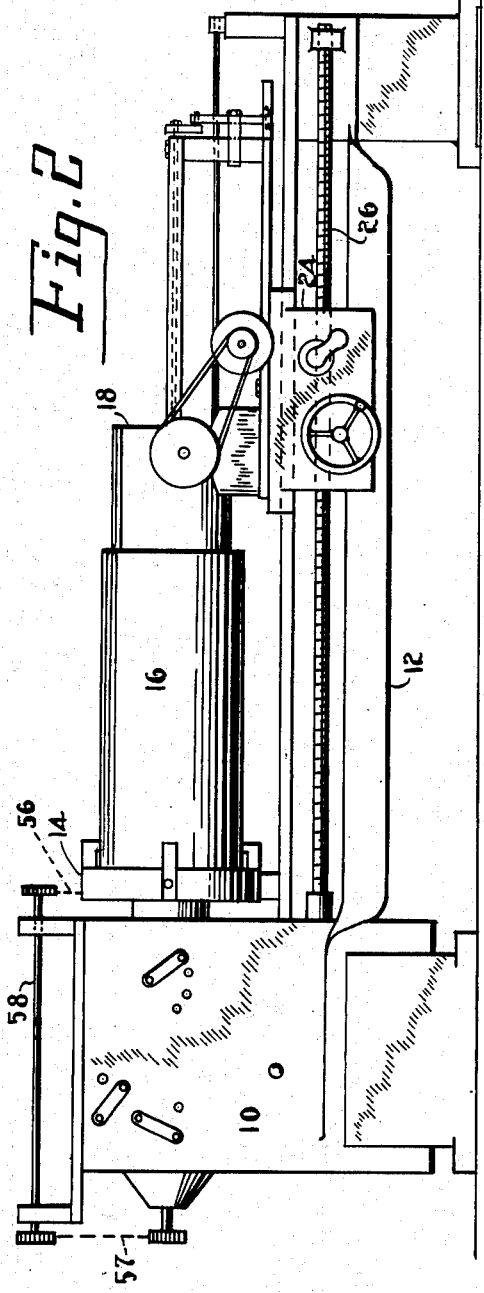
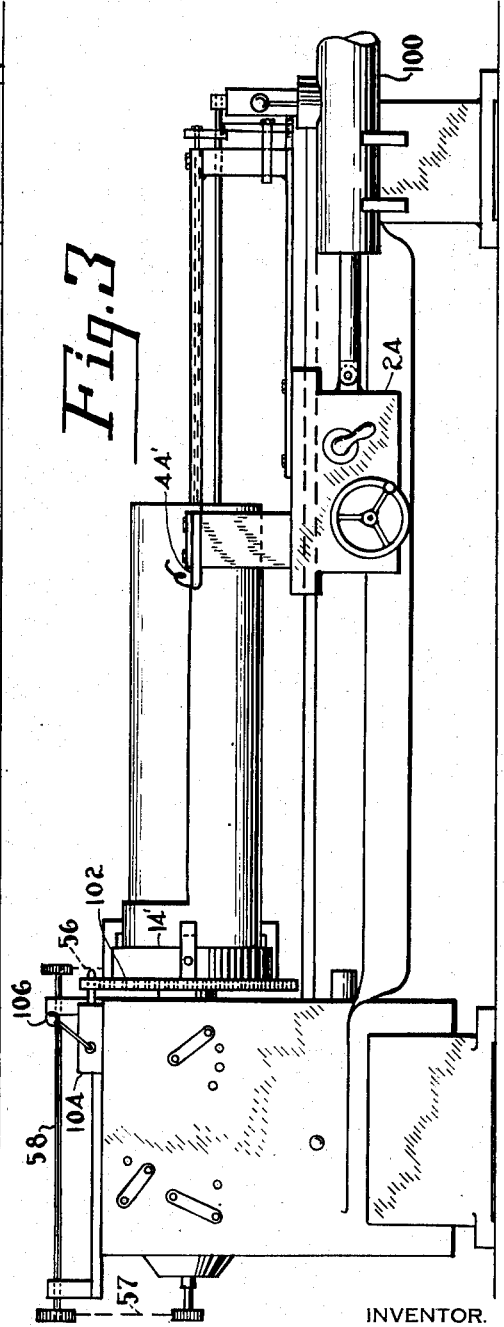
INVENTOR.
Frank M. Le Compte
BY Godfrey B. Speir
ATTORNEYS.

Patented June 22, 1954

2,681,595

UNITED STATES PATENT OFFICE 2,681,595

CONTOUR MACHINING SYSTEM

Frank M. Le Compte, Chatham, N. J., assignor to Curtiss-Wright Corporation, a corporation of Delaware Application July 29, 1949, Serial No. 107,553

6 Claims. (Cl. 90—13.9)

This invention relates to machine tools and to machining techniques and methods. The improvements set forth are concerned particularly with the precise machining of articles having irregular shape and with the machining of thin or light gauge materials which during ordinary machining processes are subject to warpage and deflections due to the loads imposed by cutting tools. The improvements also include mechanism for following portions of the workpiece as a cutting tool moves over another portion of the workpiece, the mechanism serving to control the position of the cutting tool and its relation to the workpiece, regardless of deflections of the workpiece in space, to establish a desired thickness or form for the machined article.

In general, the provisions of this invention are adapted for use on lathes or milling machines or other types of machine tools but the invention is not restricted to any particular machine tool. In one of its simpler forms, the invention is applied to a lathe for the purpose of machining a thin tubular workpiece. The tube is chucked at one end in the headstock of the lathe, the tube being rotated by the headstock spindle and centered only approximately. The wall of the tube bore is used as a reference or datum surface and a follower continuously engages a portion of the bore wall at a point opposite from the cutting tool. This tool, preferably, is in the form of a rotating end mill, the mill engaging the exterior surface of the tube. A cam adjacent the workpiece and rotatable therewith has a shape corresponding to the desired final configuration of the workpiece, and a follower bears upon this cam and is linked to the workpiece follower. These two followers, in conjunction with a follow-back linkage responsive to position of the cutting tool, operate a servo system providing power for moving the cutting tool toward and away from the workpiece as the latter rotates. Thus, the tool is always spaced from the workpiece follower by a certain distance established by the cam shape and by the initial setting of the tool with respect to the workpiece follower. As the workpiece rotates in the headstock and as longitudinal feed of the tool and workpiece follower progresses, the workpiece will be machined to correct thickness and form regardless of deflections thereof during the machining operation.

Objects of the invention are to provide apparatus and methods for machining workpieces to desired dimensions, to provide a flexible machining system for thin workpieces; to provide a machining system which will produce accurate parts even though the parts may deflect or may be misaligned during the machining process, to provide machining mechanisms and methods which will obviate the need for a firm and rigid arbor or mandrel or other workpiece holder, to provide mechanism and techniques for machining workpieces into odd forms and shapes, and to provide mechanisms and techniques adaptable to standard machine tools by which the previously outlined objectives may be attained . Further objects are to eliminate any need for precise set-up procedures, highly skillful operators and special center indicators and to enable unchucking of partly completed work with the assurance that rechucking will yield accurate results without special alignment procedures.

Previous machining practices have included cam-guided cutting tools movable over a workpiece but in all such practices of which applicant has knowledge, the workpiece must be securely and rigidly mounted in order that precise machining may be obtained. Such rigid mounting may depend either upon the rigidity of the workpiece itself and requires accurate centering or positioning of the workpiece in the machine tool, or it may depend upon the secure mounting of the workpiece upon a rigid arbor or fixture which is held in the machine tool. The provisions of this invention obviate the need for such rigid workpieces or for such rigid mounting of workpieces and permit a yielding and slender workpiece to move more or less freely in space, the mechanisms provided in the invention following the workpiece in its free movements and still providing for accurate surface finish thereof.

The prior art provides various portable machining apparatus which may be mounted securely upon a rigid workpiece, the machining device depending for precision upon the rigidity of the workpiece and upon the accurate position of the machining device thereon. The present apparatus distinguishes from such apparatus in that the workpiece is mounted in a rugged machine tool of which the cutter, follower, and forming cam comprise a part, the workpiece being removable from the machine tool without disturbing the settings of the several machine tool components, thereby enabling repetitious machining operations on a large number of similar parts. The provisions of this invention are adapted essentially for production whereas the portable apparatus just mentioned is adapted more particularly for the servicing or remachining of parts under service conditions.

A more complete understanding of the provisions of this invention may be secured by reading the annexed detailed description in connection with the drawings in which similar reference characters represent similar parts and in which:

Fig. 2 is a front elevation of a lathe incorporating the features shown in greater detail in Fig. 1; and Fig. 3 is a front elevation of a machine tool showing an alternative system for accomplishing the same end result.

Figure 1:
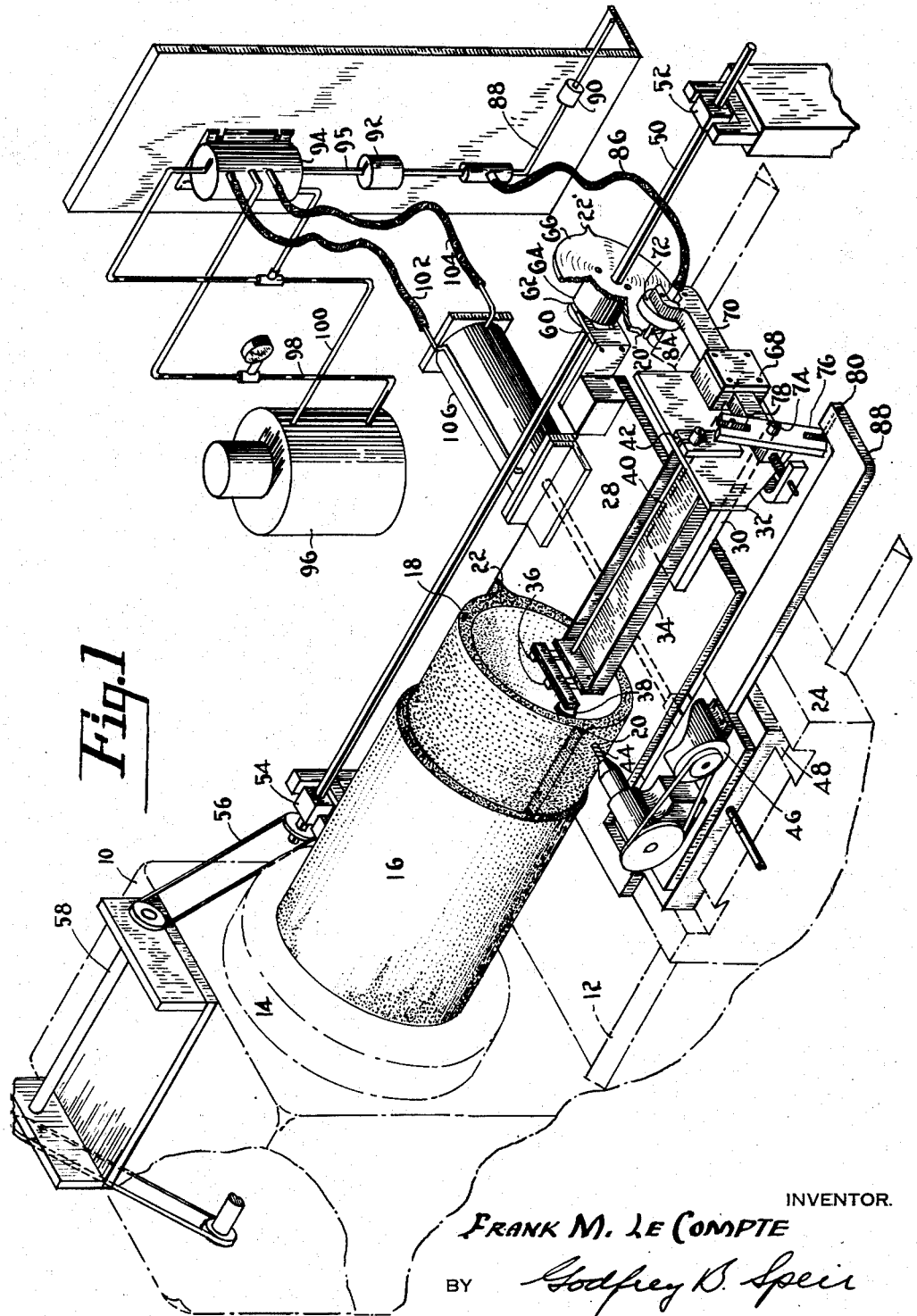
Fig. 1 is a perspective elevation of a portion of a lathe including a workpiece and the mechanism of the invention.

Reference should first be made to Figs. 1 and 2. In these figures 10 represents a conventionalized lathe headstock associated in the usual manner with a lathe bed 12. The headstock carries a chuck 14 in which is mounted a tubular workpiece 16, the end 18 of said workpiece being open and unsupported. The objective in machining the tube 16 is to reduce its wall thickness and to profile the exterior surface of the tube with certain desired protrusions represented, in the example chosen for illustration, by ribs 20 and 22. Alternatively, a uniform thin tube wall may be produced.

Upon the lathe bed 12 is the conventional carriage 24, movable longitudinally along the bed by means of a lead screw 26 rotated by mechanism within the headstock 10 and cooperating with conventional longitudinal feed mechanism in the apron of the carriage 24. Upon the carriage is secured a plate 28 having thereon a bracket 30, in turn carrying a bracket 32, which in turn supports a beam 34 which extends from the bracket 32 toward and into the hollow of the tube 16. The length of the beam 34 depends upon the maximum longitudinal feed desired on the outside of the tube. On the beam 34 is mounted a parallelogram linkage 36 carrying a workpiece follower 38 which as shown is in the form of a small wheel, this wheel bearing upon the wall of the tube bore. The linkage 36 connects, by means of a torque rod 40, to a link 42, the rod 40 having bearing support in the bracket 32. By the mechanism thus far described, the link 42 oscillates about the rod 40 as the tube 16 rotates and as the tube 16 deviates from concentricity with the headstock axis, since the follower 38 will move substantially radially, back and forth, as the tube wall upon which it bears deviates from headstock axis concentricity. The follower 38 is positioned to lie opposite a milling cutter 44 driven by a motor 46, the cutter-motor assembly being mounted upon a cross feed slide 48 dovetail-mounted in the usual manner on the top of the carriage 24.

Preferably along the back of the lathe bed and elevated thereabove is a grooved rod 50 mounted in bearings 52 and 54 fixed to the lathe bed and rotated from the headstock by a suitable transmission represented by chains 56 and 57, the chain 56 engaging sprockets on the shaft 50 and on a lay shaft 58, the lay shaft being chain driven from the lathe headstock spindle by the chain 57. The drive ratio in this arrangement of the system is such that the grooved shaft 50 rotates in unison with the workpiece 16. Alternate forms of grooved shaft drive obviously may be incorporated in the system and repetitive profiles may be secured on the workpiece circumference from a cam having a single profile but turning at a greater speed than the workpiece. Upon the plate 28 on the carriage is mounted a yoke 60 engaging a groove 62 in a cam hub 64 slidably mounted upon the shaft 50 but rotatable therewith, the hub 64 having an appropriate key, not shown, engaging the groove of the shaft 50. Upon the hub 64, a cam 66 is secured, said cam having an external profile corresponding to the profile desired on the exterior of the workpiece 16. In the system shown, the cam 66 has lobes 20' and 22' corresponding to the desired protrusions 20 and 22 shown on the workpiece 16. With the mechanism described, the cam 66 rotates with the workpiece but moves longitudinally therealong as the carriage 24 is fed longitudinally.

Secured to the bracket 32 is a grooved block 68 to which is fitted a transversely slidable bar 70, this bar carrying at its rearward end a sensing device 72 and at its forward end a cross pin 74 which is engaged with the center of a toggle link 76. The link 76 is slotted at its upper and lower ends, the upper slot 78 engaging a pin extending from the link 42 and the lower slot engaging a pin 80 secured to an extension 82 mounted on the cross slide 48. By this mechanism, the sensing device 72 is sensitive to movement of the cam projections, and of the bar 70 which in turn is controlled in its movement by the workpiece follower 38 and by the cross slide 48.

The sensing device 72, mounted on the bar 70, includes a follower pin 84 which is movable in slight degree to control an air bleed opening in the device 72, said device being furnished with compressed air through a flexible conduit 86 from a pneumatic pressure line 88 fed from a compressor source, not shown, through a constant flow valve 90. The line 88 is also connected to a pneumatic servo valve 92 the latter controlling a hydraulic valve 94 through a valve stem 95, the valve 94 controlling the supply of pressurized hydraulic fluid to the cross feed system of the lathe. 96 represents the source of hydraulic fluid pressure such as a pump, reservoir and accumulator unit, well known in the art. The air system above briefly outlined is generally known in the prior art and is disclosed in various patents including patents owned by the Bailey Meter Company such as 2,372,427 and others. From this pressure source, a pressure line 98 leads to the valve unit 94 and a scavenge line 100 leads from the valve 94 back to the pressure source. Operation of the valve 94 controls the feed of hydraulic pressure fluid, through lines 102 and 104, to a piston-cylinder ram 106 mounted upon the carriage 24, the piston rod of the ram 106 being secured to the cross feed slide 48 upon which the milling cutter 44 and its driving motor 46 are mounted.

The pneumatic sensing device 72, the servo valve 92 and the hydraulic servo control system just outlined, are all mechanisms which individually are well known in the art and it is not deemed necessary to show or describe the detailed components and their operation. However, brief remarks are appropriate to describe the general functioning of the system including these components. When the pin 84 is in its normal position, a fixed bleed of compressed air from the line 86 is permitted from the device 72 creating in the valve 92 a certain pressure which is adjusted to cause a balance of the hydraulic valve 94 to hold the piston of the ram 106 in fixed position. If the pin 84 is moved in one direction, air in the line 86 will be bled from the device 72 causing a pressure drop in the valve 92, adjusting valve 94, whereupon the ram piston moves in one direction. If the pin 84 is displaced oppositely the orifice in the device 72 will be closed and the pressure in the line 86 and on the valve 92 will increase, causing the hydraulic valve 94 to operate reversely and to move the piston of the ram 106 in the opposite direction from that previously described.

Since the pin 84 is position controlled both by the cam 66 and by the bar 70, any movement of either of these elements will cause operation of the servo system to move the cross feed slide 48 toward or away from the workpiece and thus the depth of cut of the cutter 44 into the workpiece 16 will positively be controlled. The follower 38, connected to the bar 70 through the linkage previously described, forms a datum and according to the initial setting of the system and of the configuration of the cam 66, will provide a further control for the cross-slide 48 and the cutter 44. The follower pin 80 connected to the cross-slide 48 by the extension 82 provides a third, follow-back, control to impose an error signal on the pin 84, through the link 76 and bar 70, if the cross-slide 48 is not positioned precisely in accordance with the tool position demands made by the cam 66 and the work follower 38 and its associated link and pin 78 engaging link 76. Thus the device 72, the bar 70 and link 76 comprise a three element differential by which position of the tool 44 and cross-slide 48 is corrected, if there is a corrective signal initiated from the cam, from the follower 38 or from the cross-slide 48.

If the cam 66 is circular, deviations in the position of the follower 38 will cause corresponding deviations in the position of the tool 44 and will thereby machine the tube wall to constant thickness even though the tube may deviate from concentricity with the headstock.

If cam lobes or protrusions (such as 20' and 22') are formed on the cam 66, they will affect the sensing device 72 and will superimpose additional movements on the cross feed slide 48, moving the latter back and forth as the workpiece and cam 66 rotate, to form protrusions (such as 20 and 22) on the workpiece.

On continuous operation of the machine, the cutting may start at the open end of the tube 16 and as the normal longitudinal feed of the carriage 24 operates, the exterior of the workpiece 16 will be machined to a uniform external shape corresponding to the shape of the cam 66. The cutting tool is controlled by the internal wall of the workpiece 16 in accordance with its instantaneous position in space.

If variations in the external profile of the workpiece 16 are desired from end to end, the cam 66 may be replaced with another cam, not axially slidable with the carriage, of greater length and upon which are formed, along the cam length, the several desired tube profiles. Nothing more need be said as to this particular phase of the invention since cam shapes for continuous variation of a workpiece profile from end to end are old in the art of copying lathes. Such old copying lathes however depend for their satisfactory operation upon rigid positioning of the workpiece, as well as of the cam, in the machine tool whereas in this invention, the workpiece need not be positively positioned and its instantaneous position in space is sensed by the follower 38 which operates the cross feed mechanism for accurate positioning of the cutting tool.

The sensing mechanism and the link 76 which combines the control movements furnished by the cam 66 and by the workpiece follower 38 is the heart of the invention herein disclosed and in this connection, it should be noted that one of the three control elements on the link 76 is the plate 28 which moves with the cross feed slide 48. This provides a follow-back arrangement on the link 76 so that as the tool 44 has been displaced as a result of a deviation called for by the follower 38 or the cam 66, the tool position, after movement thereof, will affect the position of the slide 70 to neutralize the ram 106 and its servo valve 94 when no further tool movement is called for.

The pneumatic and hydraulic system for tool movement can be arranged by those skilled in the art to provide fast response, without hunting and without oscillation, when controlled movement of the tool is called for by the workpiece follower or by the cam 66.

Fig. 3 shows an alternative arrangement of the system wherein the lathe or other appropriate machine tool is adapted for longitudinal cutting of the workpiece in the manner used in a shaper or planer rather than turning cutting as shown and described in connection with Figs. 1 and 2. Herein, the basic control mechanism previously described may remain the same as before but tool feed is accomplished by movement of the carriage 24' along the lathe bed by an appropriate hydraulic ram 100. The carriage 24' may carry a shaping cutter 44' instead of the milling cutter 44 previously mentioned. Indexing of the headstock, which in this embodiment would not rotate continuously, may be accomplished manually or by power, using an index head 102 on the chuck 14', said index head being locked in different positions of rotation by means of a stop mechanism 104 which may be manually or power operated, a manual control for the stop 104 being shown at 106. Index movements of the chuck are coordinated with index movements of the cam 66 previously described through an appropriate transmission mechanism similar to that previously described and incorporating chains and sprockets 56, 57 and 58.

The arrangements shown in the figures and described above, are to be considered as merely exemplary of a machining system wherein triple control of the cutting tool is afforded, one of these controls being responsive to the position of the cutting tool itself, another being responsive to the position of the workpiece in space, and the third being responsive to a contour or profile control element, all three of these controls cooperating through a servo system to obtain a desired workpiece thickness and profile. By the skillful arrangement of the essential components of this invention wide latitude is afforded for the machining of elements of nearly any shape and of nearly any degree of flexibility, either on special machines adapted for a particular kind of workpiece or by auxiliary mechanism applied to any of the conventional forms of machine tools such as lathes, shapers, milling machines, drill presses, boring mills, planers or grinders.

Though several embodiments illustrating the invention have been shown and described, it is to be understood that the invention may be applied in other and various forms. Changes may be made in the arrangements, without departing from the spirit of the invention. Reference should be had to the appended claims for definitions of the limits of the invention.

What is claimed is:

1. Apparatus for machining tubular members comprising a rotating spindle carrying a tubular workpiece the workpiece being approximately coaxial therewith and having inner and outer surfaces defining a wall therebetween, a floating follower engaging one said surface of said tube, movable substantially radially while engaging said surface, a material removing tool opposite said follower and spaced therefrom substantially by the thickness of said tube wall, power means for moving said tool radially toward and away from the other surface of said tube on substantially the same radius as that along which said follower moves, means to sense radial movements of said follower, means controlled by said sensing means to operate said power means, a cam rotatable with said workpiece profiled to modify the wall thickness from uniformity, and a follower engaging said cam controlling said power means in conjunction with the control thereof afforded by said workpiece follower.

2. Apparatus for machining tubular members comprising a rotating spindle carrying a tubular workpiece the workpiece being approximately coaxial therewith and having inner and outer surfaces defining a wall therebetween, a floating follower engaging one surface of said tube, movable substantially radially while engaging said surface, a material removing tool opposite said follower and spaced therefrom substantially by the thickness of said tube wall, power means for moving said tool radially toward and away from the other surface of said tube on substantially the same radius as that along which said follower moves, means to sense radial movements of said follower, means controlled by said sensing means to operate said power means, a cam rotatable with said workpiece profiled to modify the wall thickness from uniformity, a follower engaging said cam controlling said power means in conjunction with the control thereof afforded by said workpiece follower, and means to feed said cam, workpiece follower, tool and power means longitudinally of said workpiece.

3. Apparatus for machining tubular members comprising a rotating spindle, means on the spindle engaged with the tubular member to hold the member substantially coaxial with the spindle, the member having an external surface and an internal surface, one said surface comprising a reference surface and the other said surface comprising a surface to be machined, a follower engaging the reference surface, a cutter engaging the other surface at a point substantially directly opposite said follower and spaced therefrom by the thickness of the workpiece wall, power means connected with the cutter to move it toward and away from the spindle axis, a control device operated by movements of said follower to actuate said power means to move the cutter toward or away from the spindle axis accordingly as the follower is moved toward or away from the spindle axis during rotation of the workpiece and as a result of eccentricity of the workpiece relative to the spindle axis, cam means formed to a profile desired on the surface to be machined, and mechanism connected to said control device and operable by said cam to actuate said power means to vary the spacing of said cutter from said follower, whereby the cutter jointly follows movement of said follower and of said mechanism.

4. In a machine tool, means for holding and rotating a tubular workpiece substantially on and about its own axis, said workpiece having an interior reference surface comprising the inner tube wall and an exterior surface to be machined comprising the outer tube wall, a carriage movable relative to the workpiece having a tool holding slide thereon, the tool thereof being organized to machine said exterior surface, a motor for moving said slide on said carriage along a certain path, a cam mounted on said machine tool formed to a shape like that which is desired on the exterior of the workpiece, a mechanism including a first movable follower entering into the interior of said tubular workpiece and engaging the interior surface of said workpiece opposite said tool and spaced from said tool substantially by the wall thickness of said tubular workpiece, a second follower connected to and movable with said slide, a third follower engaging and movable along the profile of said cam, said three followers being interlinked and said mechanism having a sensing device to sense deviations in the relative positions between said three followers, and means responsive to operation of said sensing device to control operation of said motor.

5. An apparatus for machining a tubular workpiece comprising a support, means on the support for holding the workpiece at one end, said means having an axis with respect to which the axis of said workpiece is approximately coaxial, the workpiece having an external surface and an internal surface separated by the wall thickness of the tubular workpiece, one said surface comprising a reference surface and the other said surface comprising a surface to be machined, a follower mounted on and movable relative to the support engaging the reference surface, a tool mounted on and movable relative to the support engaging the other surface at a region substantially directly opposite said follower and spaced therefrom by the thickness of the workpiece wall, means to move the workpiece relative to the cutter and follower for positioning them at different portions of the workpiece, means on the support connected with the tool to move it toward and away from said axis, and a control device operated by movements of said follower in following said reference surface toward and away from said axis to actuate said tool moving means and to move the tool toward and away from said axis during movement of the workpiece relative to the tool and follower and as a result of eccentricity of the workpiece relative to the said axis.

6. An apparatus for machining a tubular workpiece comprising a support, means on the support for holding the workpiece at one end, said means having an axis with respect to which the axis of said workpiece is approximately coaxial, the workpiece having an external surface and an internal surface separated by the wall thickness of the tubular workpiece, one said surface comprising a reference surface and the other said surface comprising a surface to be machined, a follower mounted on and movable relative to the support engaging the reference surface, a tool mounted on and movable relative to the support engaging the other surface at a region substantially directly opposite said follower and spaced therefrom by the thickness of the workpiece wall, means to move the workpiece relative to the cutter and follower for positioning them at different portions of the workpiece, means on the support connected with the tool to move it toward and away from said axis, a control device operated by movements of said follower in following said reference surface toward and away from said axis to actuate said tool moving means and to move the tool toward and away from said axis during movement of the workpiece relative to the tool and follower and as a result of eccentricity of the workpiece relative to the said axis, cam means formed to a profile desired on the surface of the workpiece, and mechanism connected to said control device and operable by said cam to actuate said tool moving means to vary the spacing of said tool from said follower, whereby said tool jointly follows movement of said follower and of said mechanism.

References Cited in the file of this patent

UNITED STATES PATENTS

| Number | Name | Date |
|---|---|---|
| 1,151,737 | Thomas | Aug. 31, 1915 |
| 1,830,027 | Hayden | Nov. 3, 1931 |
| 2,313,849 | Turchan | Mar. 16, 1943 |
| 2,330,566 | Edmonds | Sept. 28, 1943 |
| 2,348,186 | Bayshore | May 9, 1944 |
| 2,372,427 | Johnson | Mar. 27, 1945 |
| 2,422,682 | Johnson | June 24, 1947 |
| 2,543,945 | Taylor | Mar. 6, 1951 |